Patented Mar. 7, 1933

1,900,409

UNITED STATES PATENT OFFICE

ANDREW J. SORENSEN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRIC CONTROL SYSTEM

Application filed May 27, 1931. Serial No. 540,351.

My invention relates to electric control systems, and particularly to control systems for railway trains.

I will describe one form of apparatus embodying my invention, and will then point out the novel features thereof in claims.

The accompanying drawings, consisting of Figs. 1 and 2, constitute a diagrammatic view of one form of apparatus embodying my invention when applied to a brake control system for a railway train. The apparatus of Fig. 1 is located on the locomotive and is governed by the condition of the usual engineer's brake valve. The apparatus of Fig. 2 is installed at another point on the train to control an auxiliary brake controlling mechanism adapted to reproduce the several operating functions of the engineer's brake valve on the locomotive. While the apparatus of Fig. 2 may be located at any point on the train, it will be considered in this description as being installed in a caboose of a freight train. That the operator on the locomotive may know that the influence transmitted by the apparatus of Fig. 1 is being received by the apparatus of Fig. 2, the apparatus of Fig. 2 is arranged to return an indicating influence to the locomotive. Furthermore, the apparatus of this system provides that messages may be exchanged between the operator on the locomotive and the crew in the caboose. While I have here shown a specific application of my invention, it will be understood that I do not wish to limit myself to train brake control systems, but that my invention may be adapted to any control system where a mechanism at one location is to be controlled from a remote point, and the form here shown will serve to illustrate all the different ways in which my invention may be applied.

Figure 1:
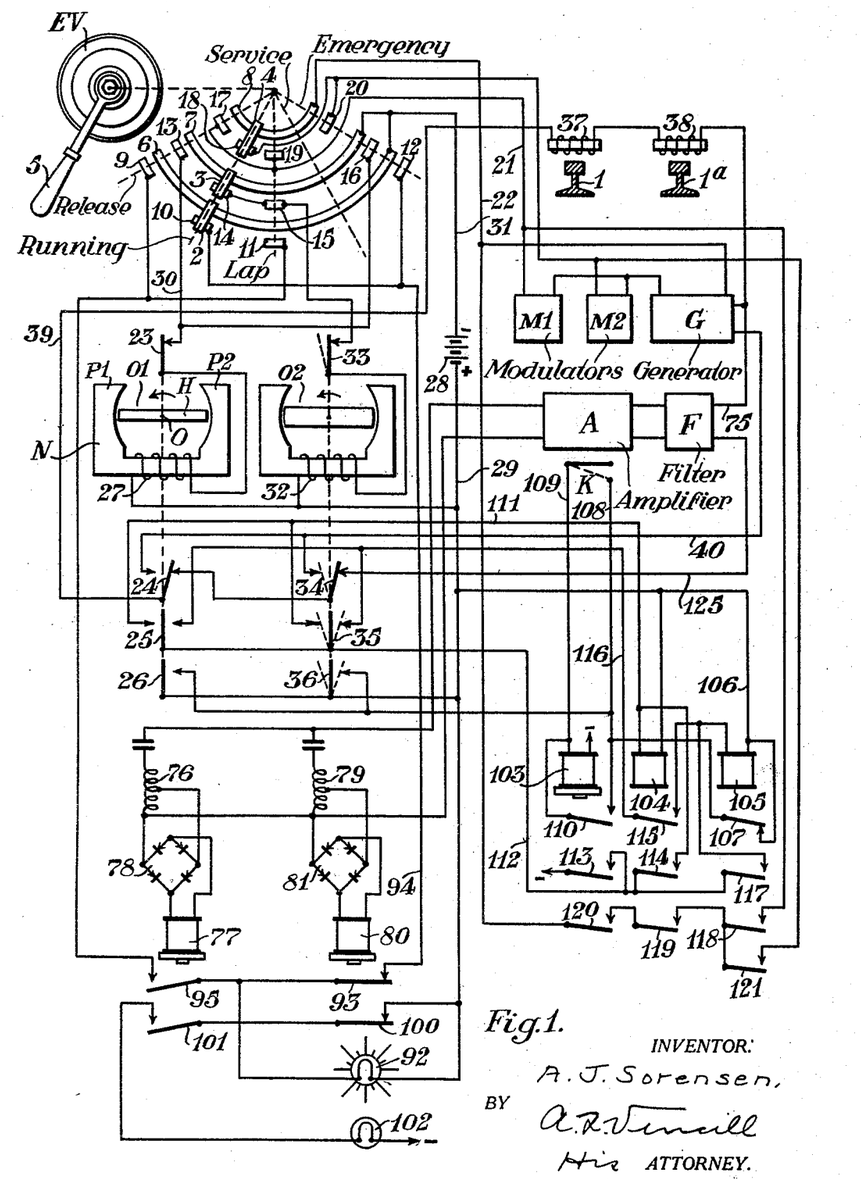

Referring to the Fig. 1, the reference character EV designates the usual engineer's brake valve of the standard type adapted to establish the "release", "running", "lap", "service" and "emergency" conditions of the brake pipe pressure. As shown schematically, the contactors 2, 3 and 4 are connected to and actuated by a handle 5 of the valve EV. These contactors 2, 3 and 4 engage the arcuate contacts 6, 7 and 8, respectively, in all positions of the handle 5. Each of the contactors 2, 3 and 4 is adapted to engage also a contact of a respective series of contacts when placed at a position corresponding to one of the several brake controlling conditions of the valve EV. The contacts associated with the contactor 2 are designated by the reference characters 9, 10, 11 and 12, and they correspond to the release, running, lap and emergency positions, respectively. The contacts associated with the contactor 3 are 13, 14, 15 and 16, while the contacts 17, 18, 19 and 20 are associated with the contactor 4.

The locomotive is provided with a generator of carrier current designated by the reference character G, which may be of a frequency of, say five thousand cycles per second. Associated with the generator G are two modulators M1 and M2 which are preferably generators of a low frequency current, say forty and fifty cycles per second, respectively. It will be understood, however, that my invention is not limited to the above-mentioned frequencies but that these frequencies are given by way of illustration only. This generator G and modulators M1 and M2 may be one of many well-known types, among them being the vacuum tube type. As the specific type of the generator or of the modulators form no part of my invention, they are indicated in the drawings by a rectangle only in order to simplify the figure as much as possible. The carrier current generated by G is modulated by either M1 or M2 in accordance with the position of the handle 5 of the valve EV. With the handle 5 at release position so that the contactor 4 engages the contacts 8 and 17, a circuit is completed for M1 by wire 21, contacts 17, 4 and 8, wire 22, generator G, and back to the opposite terminal of M1. Likewise, when the handle 5 is at the lap position so that the contactor 4 engages the contacts 8 and 19, the above traced circuit for M1 is completed also. When the handle 5 is at the running position so that the contactor 4 engages contacts 8 and 18, or when it is at the emergency position so that the contactor 4 engages 8 and 20, a circuit is completed for the modulator M2 to the generator G, as will be readily understood from the Fig. 1.

The apparatus of Fig. 1 includes two coding devices designated as O1 and O2. These coding devices may take different forms but are here shown as mechanically tuned oscillators preferably of a structure similar to that disclosed and fully described in the copending application of Paul N. Bossart for United States Letters Patent, Serial No. 398,342, filed Oct. 9, 1929. It is deemed sufficient for this specification to give but a brief description of these oscillators. Referring to O1, the field structure N has mounted between its two poles P1 and P2 an armature H pivoted at O and biased to a given position such as that shown in the figure by springs not shown. Actuated by the armature H are four contact members 23, 24, 25 and 26. When direct current energizes the field winding 27, the armature H is caused to rotate from the position shown in the figure in a direction indicated by an arrow. The current for energizing the field winding 27 is provided by a battery 28 along a circuit consisting of wire 29, field winding 27, a normally closed contact of the contact member 23, wire 30, contacts 13, 3 and 7 when the handle 5 is at the release position, or contacts 16, 3 and 7 when the handle 5 is at the emergency position, and then wire 31 back to the negative terminal of the battery 28. With either of these paths closed and the field winding 27 energized, the armature H swings in the direction indicated by the arrow and after a small movement, the contact member 23 is caused to disengage its contact to open the above traced circuit so that the field winding 27 becomes deenergized. The armature H will rotate a little farther and then its movement is reversed due to its bias. As armature H swings backward to again close the contact of 23 to reenergize the field winding 27, the armature H will swing slightly past its normal position due to the inertia of its parts and then it is again rotated in the direction indicated by the arrow due to the reenergizing of the field winding 27. It follows that with the circuit for the field winding 27 completed by the contactor 3, the armature H of O1 will oscillate at its natural period. The period of oscillation is determined by its biasing and by the weight of its parts, and while the period of oscillation may be made that of any convenient frequency, I shall consider it to be, say one hundred and twenty cycles per minute. The oscillator O2 is similar to that of O1, and the circuit for its field winding 32 includes its own contact member 33 and contact 14 or 15 associated with the contactor 3 operated by handle 5. Thus with the handle 5 at either the running or lap position, the oscillator O2 is rendered active. The bias and the weight of the parts of its armature H are so chosen that it will oscillate at say eighty cycles per minute. From the foregoing description, it will be evident that as the armature H of O1 oscillates, its contact members 24 and 25 will alternately engage with their respective left-hand and right-hand contacts, while the contact member 26 will engage a right-hand contact once during each cycle. In a like manner, the members 34 and 35 of oscillator O2 will alternately engage with left-hand and right-hand contacts as its armature H is oscillated, while the contact member 36 will engage a right-hand contact once during each cycle.

The inductor coils 37 and 38 are mounted on the locomotive in inductive relation with the traffic rails 1 and 1ª, respectively, and these coils are, at times, connected to the generator G by a circuit that extends from one terminal of 37 along the wire 39, left-hand contact of the contact member 24 of oscillator O1, wire 40, generator G and back to the opposite terminal of the coils 37 and 38. When the oscillator O1 is non-active so that its contact member 24 remains in engagement with its right-hand contact then the above output circuit from the generator to the coils 37 and 38 may be completed at the left-hand contact of the contact member 34 of oscillator O2. Thus with the handle 5 placed at its release, running, lap or emergency position so that one or the other of the oscillators O1 and O2 is rendered active, the generator G is connected to the inductor coils 37 and 38 substantially one-half of each cycle of the active oscillator to supply an impulse of modulated carrier current to the traffic rails.

In my invention, therefore, the code impulses of the carrier current are provided with two distinctive types of characteristics one type being provided by the oscillators O1 and O2, while the other type of characteristic is provided by the modulators M1 and M2. The selection of characteristics to be applied to the code impulses is determined by the position of the brake valve EV through the medium of the contactors operated by the handle 5. In other words, with the handle 5 at release, the impulses are modulated by M1 and they are of relatively short duration as the frequency or rate at which they occur is determined by the oscillator O1 which operates at one hundred and twenty cycles per minute. With the handle 5 at running position, the impulses are modulated by M2 and the duration of each impulse is relatively long as the frequency or rate at which they occur is determined by the oscillator O2 which operates at eighty cycles per minute. At the lap position of the handle 5, the modulation is that of M1, while the frequency of the impulses, that is, the rate at which they occur, is determined by the oscillator O2. At the service position of the handle 5 there are provided no contacts to engage the contactors and thus there will be no outgoing impulses supplied to the traffic rails, while at the emergency position, the modulation is that of M2 and the active oscillator is O1. To sum up, therefore, the different conditions of the valve EV are identified in the outgoing code impulses of the carrier current by different modulations and by the different frequencies of their occurrence. While a specific combination of modulation and frequency of occurrence has been selected above for each operating function of the valve EV, it will be understood that I am not limited to the above given combinations but that other combinations could readily have been chosen without departing from the scope of my invention.

Figure 2:
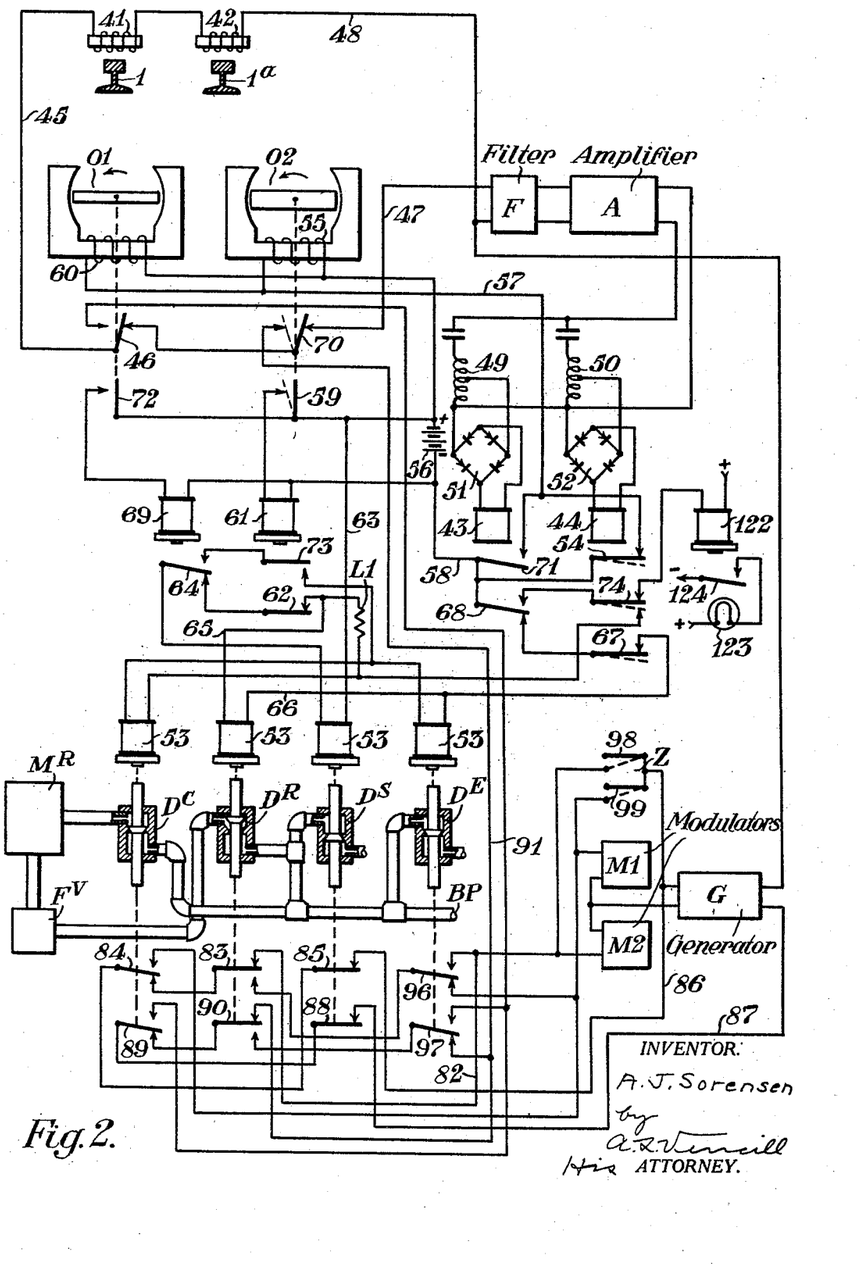

Referring to the Fig. 2, there is installed at the caboose, a pair of inductor coils 41 and 42 similar to those mounted on the locomotive and they are also located in inductive relation with the traffic rails. The caboose is also provided with two mechanically tuned oscillators O1 and O2 preferably similar in all respects to the mechanically tuned locomotive oscillators O1 and O2, respectively, except for the fact that the periodic energizing of their respective field windings is controlled by the code operating relays 43 and 44 to be later described instead of by one of their own contacts as shown in Fig. 1. The inductor coils 41 and 42 are normally connected to the input circuit of a filter F, through which incoming energy is applied to an amplifier A, by a circuit completed along wire 45, a right-hand contact of the contact member 46 of oscillator O1, right-hand contact of the contact member 70 of the oscillator O2, wire 47, filter F, and wire 48 to the opposite terminal of the coils 41 and 42. Filter F and amplifier A may be one of many well-known types and, as they form no part of my invention, they are indicated in the figure by a symbol only. The filter F is tuned to pass carrier current of the frequency only of the generator G on the locomotive to the input of amplifier A and to filter out carrier current of other frequencies. The amplifier A acts to amplify and demodulate the current received through the filter F. The output of amplifier A is connected to a selective network which includes two sharply tuned circuits 49 and 50. The circuit 49 is tuned to resonance at the frequency of the modulator M1 of Fig. 1 so that in response to incoming carrier current modulated by M1, this circuit supplies current to the code following relay 43 through a full-wave rectifier 51 to operate that relay. Relay 43 is a quick-acting relay that will readily operate once every cycle of either oscillator of Fig. 1. The circuit 50 is tuned to resonance at the frequency of the modulator M2 of Fig. 1 so that in response to carrier current modulated by M2, current is supplied to the code following relay 44 through a full-wave rectifier 52 to operate that relay. The relay 44 is a quick-acting relay that will readily operate also once every cycle of either oscillator of Fig. 1.

The caboose is equipped with a main reservoir $M^R$, a feed valve $F^V$ and electropneumatic valves $D^C$, $D^R$, $D^S$ and $D^E$. The caboose, of course, will also be equipped with a compressor and the other necessary apparatus to insure ample supply of air pressure in the main reservoir $M^R$. The valves $D^C$, $D^R$ and $D^E$ are each biased to a closed position and each is open when its associated magnet 53 is energized. The valve $D^S$ is biased to an open position and is held closed when its magnet 53 is energized. When the valve $D^C$ is open then the brake pipe BP is connected to the main reservoir $M^R$ and the auxiliary brake controlling mechanism reproduces the release condition of the engineer's valve EV. When the valve $D^R$ is open, then the brake pipe BP is connected to the feed valve $F^V$ and the auxiliary brake controlling mechanism reproduces the running condition of the engineer's valve EV. With the valve $D^S$ open, that is, when its magnet 53 is deenergized, the brake pipe BP is connected to the atmosphere through a vent of such characteristics as to produce a reduction of the brake pipe pressure at substantially the service rate of the usual brake valve to effect the service application of the brakes. When the valve $D^E$ is open, then the brake pipe is connected to the atmosphere through a vent of such characteristics as to produce the emergency rate of reduction of the brake pipe pressure and an emergency application of the brakes. When the valve $D^S$ is closed and the remaining valve magnets all deenergized, both supply and exhaust of the brake pipe are blanked and the auxiliary mechanism reproduces the lap condition of the usual brake valve. In the form of the apparatus shown in Fig. 2, the service valve $D^S$ is normally retained energized in series with any one of the other valves to insure a closed circuit principle for the equipment. It will be understood, however, that any one of the other valves might be used in this way if it seems desirable to do so. The magnet of each of the several valves is provided with slow-releasing characteristics so that the valve remains in the energized position in response to intermittent energizing of its magnet. If, in the practice of my invention, it is found difficult to obtain a long enough release period for this type of magnet valve, then slow-releasing relays can be substituted for each magnet and the relays made to control, in turn, the magnet of the corresponding valve.

In describing the operation of the auxiliary brake controlling mechanism of Fig. 2, I shall first assume that the handle 5 of the brake valve EV is at the running position, as shown in Fig. 1 so that its contactor 4 engages the contacts 8 and 18 to complete the circuit for the modulator M2, and the contactor 3 engages the contacts 7 and 14 to render the oscillator O2 active. As previously pointed out, substantially one-half of each cycle of the oscillator O2, the generator G is connected with the coils 37 and 38 and thus it follows that impulses of carrier current modulated by M2 are periodically supplied to the traffic rails at a rate of occurrence determined by oscillator O2. When these impulses are picked up by the coils 41 and 42 at the caboose and applied to its amplifier A through the filter F, the circuit 50 is responsive to operate the relay 44 once each received impulse. Each time the relay 44 picks up to close the front contact 54, a circuit is completed to the field winding 55 of the oscillator O2 in the caboose from the battery 56 through field winding 55, wire 57, front contact 54 of relay 44, and wire 58 to the negative terminal of the battery 56. Since the natural period of the oscillator O2 in the caboose is the same as the rate of occurrence of the incoming impulses as determined by the oscillator O2 of Fig. 1, it will operate its armature at full amplitude to alternately close the left-hand and right-hand contacts of its contact member 70 and to close once each cycle the contact 59. The field winding 60 of the oscillator O1 of Fig. 2 is in parallel with the field winding 55 and it will therefore also become energized each operation of the relay 44. However, as the oscillator O1 of Fig. 2 is mechanically tuned to the frequency of the oscillator O1 of Fig. 1, which has a natural period different than oscillator O2 of Fig. 1, it will at this time be operated to only a small degree of amplitude and can thus be considered as being non-active. Due to the operation of the oscillator O2, the contact 59 will close once each cycle the circuit to the winding of a slow-releasing relay 61, as will be evident from the Fig. 2. The slow-releasing characteristics of this relay 61 will retain it in its energized position as long as the oscillator O2 continues to be operated. With relay 61 energized to close its front contact 62, current is supplied to the magnets 53 of each of the valves $D^S$ and $D^R$ once each cycle over a circuit extending from the positive terminal of the battery 56 along wire 63, magnet 53 of valve $D^S$, back contact 64 of relay 69, front contact 62 of the relay 61, wire 65, magnet 53 of the valve $D^R$, wire 66, front contact 67 of the relay 44 each time relay 44 is picked up by an incoming impulse, back contact 68 of the relay 43, and wire 58 to the negative terminal of the battery 56. As the magnets 53 of both valves $D^R$ and $D^S$ have slow release characteristics they remain in the energized condition when thus intermittently energized. It will be seen, therefore, that with the brake valve EV set at the running position, the auxiliary brake controlling mechanism in the caboose establishes the running condition of the brake pipe pressure.

In the event the handle 5 is set at the release position, the impulses supplied to the track rails by the generator G on the locomotive are modulated by M1 and their rate of occurrence determined by the oscillator O1. These impulses, when picked up by the inductor coils 41 and 42 and applied to the caboose amplifier A, causes the circuit 49 to energize the relay 43 so that that relay is operated once each impulse. Each time relay 43 closes its front contact 71, current is supplied to the field windings 55 and 60 of the oscillators O2 and O1 in the caboose. As the caboose oscillator O1 is mechanically tuned to the rate of occurrence of these impulses, its armature will be operated at full amplitude, while the armature of oscillator O2 will remain substantially non-active. When the oscillator O1 in the caboose is actuated to close its contact 72, current is supplied to the winding of a slow-releasing relay 69 so that that relay remains energized as long as the oscillator O1 continues to be operated in step with the incoming impulses. The energizing of relay 69 completes a circuit from battery 56 along wire 63, magnet 53 of the valve $D^S$, front contact 64 of relay 69, back contact 73 of the relay 61, magnet 53 of the valve $D^C$, back contact 74 of the relay 44, front contact 68 of the relay 43, and wire 58 back to the battery 56. The slow-releasing characteristics of the magnets 53 of the valves $D^S$ and $D^C$ cause these valves to remain in the energized position in response to the periodical closing of the front contact 68 of the code relay 43 and thus we see that the release condition of the valve EV is reproduced in the caboose. Again let us consider that the handle 5 is at the lap position so that the impulses supplied to the traffic rails by the locomotive apparatus are modulated by M1 and their frequency is that of the oscillator O2. This time the relay 43 and the oscillator O2 in the caboose are operated. The operation of the oscillator O2 energizes the relay 61 as before pointed out and current is now supplied once each impulse from the battery 56 to the magnet 53 of the valve $D^S$ through the back contact 64 of the relay 69, front contact 62 of the relay 61, a resistance L1, back contact 74 of the relay 44, front contact 68 of the relay 43 once each impulse and to the negative terminal of the battery 56. The lap condition established by the brake valve EV is thus reproduced by the auxiliary mechanism in the caboose.

With the handle 5 at the service position, no impulses are supplied to the rails by the locomotive apparatus resulting in all the apparatus of Fig. 2 becoming deenergized so that the auxiliary mechanism at once establishes a service brake application. When the handle 5 is placed at the emergency position and the impulses sent out by the locomotive apparatus are modulated by M2 and their frequency determined by the oscillator O1, the relay 44 and the oscillator O1 in the caboose are operated. The energizing of the relay 69 in response to the operation of the oscillator O1 completes a circuit for supplying current from the battery 56 through the magnet 53 of the valve D$^S$, front contact 64 of the relay 69, back contact 73 of the relay 61, magnet 53 of the valve D$^E$, front contact 67 of the relay 44, back contact 68 of the relay 43 once each impulse and back to the negative terminal of the battery 56. To sum up, therefore, the several operating conditions of the valve EV are each, in turn, reproduced by the auxiliary brake controlling mechanism in the caboose.

That the operator on the locomotive may know that the influence being sent out by the locomotive equipment is being received at the caboose, the equipment of Fig. 2 is adapted to return an indication impulse. This requirement necessitates that the caboose be equipped with sending apparatus and that the locomotive equipment include receiving apparatus. Looking at Fig. 1, the filter F through which energy is supplied to amplifier A is normally connected to the inductor coils 37 and 38 by a circuit that extends from one terminal of F along wire 125, right-hand contact of the contact member 34 of the oscillator O2, right-hand contact of the contact member 24 of oscillator O1, wire 39, coils 37 and 38, and wire 75 back to the opposite terminal of filter F. While this filter F and the amplifier A of Fig. 1 may be one of the many well known types, they are preferably similar to those in the caboose. The filter F of Fig. 1 is tuned to pass carrier current of the frequency only of a generator in the caboose, to be shortly described, to the input of amplifier A and to filter out carrier current of other frequencies. When either oscillator O1 or O2 of Fig. 1 is rendered active by the handle 5 being placed at some one of its operating positions, the above traced input circuit is closed substantially one-half of each cycle of the active oscillator O1 or O2. As previously pointed out, the output circuit is closed during substantially one-half of each cycle of either oscillator O1 or O2, depending upon which is operated, to cause contact member 24 or 34, respectively to engage its left-hand contact. It follows then that the output and input circuits on the locomotive are alternately connected to the inductor coils 37 and 38. In other words, the apparatus of Fig. 1 is alternately in its sending and receiving condition for substantially equal periods of time, the duration of the period being determined by the oscillator that is active.

The output of the amplifier A of Fig. 1 is connected to a selective network including two sharply tuned circuits 76 and 79 similar to those described for Fig. 2. The circuit 76 is tuned to be responsive to impulses modulated at the frequency of M1 to supply current to the relay 77 through a rectifier 78, while the circuit 79 is responsive to impulses modulated at the frequency of M2 to supply current to the relay 80 through the rectifier 81. The relays 77 and 80 instead of being quick-acting as were the relays 43 and 44 of Fig. 2 are each provided with slow-releasing characteristics so that they remain in their energized position in response to periodical impulses applied to the amplifier A.

Turning now to Fig. 2, the caboose is provided with a generator G and two modulators M1 and M2 preferably similar to those described for Fig. 1. In order that the return indication may mean not only that the control influence sent out from the locomotive has been received at the caboose but also that the valves have actually functioned, each valve has attached to its moving parts a set of circuit controllers adapted to make on their front contacts when the valve is energized and on their back contacts when the valve is deenergized. These contacts are used to control the circuits for the modulators M1 and M2, and also the output circuit of the generator G.

I will now assume that the operator on the locomotive has set the handle of the valve EV at the running position, that the impulses sent out from the locomotive have been received at the caboose, and that the auxiliary mechanism has established its running condition by energizing the magnets of valves D$^R$ and D$^S$. The energizing of the valves D$^R$ and D$^S$ closes a circuit for the modulator M2 that includes the wire 82, front contact 83 of the valve D$^R$, back contact 84 of valve D$^C$, front contact 85 of valve D$^S$, wire 86, the generator G, and back to the modulator M2. The output circuit for the generator G is also completed when the valves D$^R$ and D$^S$ become energized by a circuit that extends from one terminal of the generator G along the wire 87, front contact 88 of the valve D$^S$, back contact 89 of valve D$^C$, front contact 90 of valve D$^R$, wire 91, left-hand contact of the contact member 70 of oscillator O2 inasmuch as this oscillator is now active, right-hand contact of the contact member 46 of oscillator O1, wire 45, inductor coils 41 and 42, wire 48, and back to the other terminal of the generator G. It follows then that under the running condition, the receipt at the caboose of impulses modulated by M2 and of a rate of occurrence determined by oscillator O2 results in the generator G in the caboose supplying to the traffic rails an indication impulse modulated by M2 during substantially one-half of each cycle of the caboose oscillator O2. To put it another way, the control and indication impulses have the same modulation and the same rate of occurrence and are alternately exchanged between the locomotive and the caboose. As pointed out above the input circuit on the locomotive is connected to the inductor coils during the half-cycle that the locomotive generator G is disconnected, and thus when these return indication impulses are supplied to the rails they are picked up at the locomotive and applied to its amplifier A. As the circuit 79 is responsive to impulses modulated by M2 the relay 80 is energized. The energizing of the relay 80 at a time when the handle 5 is at the running position so that the contactor 2 engages the contacts 6 and 10, causes current to be supplied to the indicating device 92, which may be a bell, a light, or a magnet, from the battery 28 along the wire 29, indicating device 92, front contact 93 of relay 80, wire 94, contacts 10, 2 and 6, and back to the negative terminal of the battery 28 by wire 31.

In the case the operator has the valve EV in the release condition, then in the caboose the oscillator O1 and relay 43 are operated and the valves $D^C$ and $D^S$ are energized. Under this set up of the auxiliary mechanism, the circuit for the modulator M1 is completed at the front contact 84 of the valve $D^C$ and the front contact 85 of the valve $D^S$. The output circuit for the caboose generator is closed during one-half of each cycle of oscillator O1 by its contact member 46 engaging its left-hand contact, inasmuch as the front contacts 88 and 89 of valves $D^S$ and $D^C$, respectively, are now closed. The modulating of the indication impulses by M1 causes the circuit 76 on the locomotive to be responsive to energize the relay 77. With the relay 77 energized and the handle 5 at the release position, we find that current is supplied from the battery 28 to the indicating device 92 by a circuit that includes the front contact 95 of the relay 77 and the contacts 9, 2 and 6 associated with the handle 5. An analysis of the condition established by the operator selecting the lap position of the valve EV discloses that the return impulses are modulated by M1 the same as the control impulses sent from the locomotive and that their duration is governed by the caboose oscillator O2. This modulation by M1 of the return impulses causes the relay 77 to be energized, and as the handle 5 is now at the lap position, the indicating device 92 is energized by a circuit that includes the front contact 95 of relay 77 and the contacts 11, 2 and 6. At the service position of the valve EV, no control impulses are sent out and the caboose apparatus is deenergized, with the result that no return indication impulses are supplied to the traffic rails. Under this condition both the relays 77 and 80 become deenergized and the indicating device 92 extinguished. In the case the operator selects the emergency position of the valve EV, the valves $D^S$ and $D^E$ in the caboose are energized and the caboose oscillator O1 operated. The circuit for the caboose modulator M2 is now closed at the front contact 96 of valve $D^E$, back contacts 83 and 84, and the front contact 85 of the valve $D^S$, while the output circuit for the caboose generator G is closed at front contact 88 of valve $D^S$, back contacts 90 and 89, front contact 97 of valve $D^E$ and at the left-hand contact of 46 of oscillator O1. The return impulses are now modulated by M2 with the result that the relay 80 on the locomotive is picked up so that current is supplied to the indicating device 92 through the front contact 93 and the contacts 12, 2 and 6.

From the foregoing description, it is seen that the caboose equipment is changed from the receiving condition to the sending condition in synchronism with the locomotive equipment, also that the brake valves must properly function in order that the return indication impulses be properly modulated and in order that the output circuit be completed. The use of contacts operated by the handle 5 in the indication circuit makes it impossible to obtain a return indication unless the proper modulation is used in the caboose.

If the crew in the caboose desires to send messages to the operator on the locomotive, the manual controller Z is depressed so as to bring the contacts 98 and 99 to the position shown by dotted lines in Fig. 2. This position of the contacts 98 and 99 completes circuits for both modulators M1 and M2 as will be readily observed by an inspection of the Fig. 2. The result of the return impulses being modulated by both M1 and M2 causes both the relays 77 and 80 on the locomotive to be energized at the same time. With both of these relays energized, then current is supplied from the positive terminal of the battery 28 through the front contact 100 of relay 80, front contact 101 of relay 77, and the signaling device 102 to the negative terminal of the battery 28. By operating the controller Z for long or short intervals, the signaling device 102 will be displayed for long or short intervals and thus any prearranged code messages can be sent from the caboose to the locomotive without disturbing the normal operation of the indicating device 92.

In order to make it possible for the operator on the locomotive to send messages to the crew in the caboose, the locomotive is provided with a manual controller K and the relays 103, 104 and 105 which operate in conjunction with the contact members 25 and 26 of the oscillator O1 or the contact members 35 and 36 of the oscillator O2. When the operator wishes to send a short signal impulse, he depresses the key K and immediately releases it again. When it is thus depresssed, both M1 and M2 are rendered active during a part or all of one sending period of the locomotive equipment depending upon the release period of the relay 103 which is provided with slow-releasing characteristics. If the operator wishes to send a long signal impulse, he depresses the key K for a longer interval of time during which time part or all of every other sending period is used for sending a signal by using both modulators M1 and M2.

If a short impulse is to be sent, the operation is as follows. As stated above, the operator closes the key K and immediately opens it again. When key K is closed, a circuit is set up from the positive terminal of battery 28 along wires 29 and 106, back contact 107 of relay 105, wire 108, key K, wire 109, winding of the relay 103 and to the negative terminal of battery 28. As soon as the relay 103 picks up, its front contact 110 is placed in parallel with the key K so that the winding of relay 103 receives energy even when key K is open. Let us now assume that the handle 5 is at the running position so that the oscillator O2 is operating. The first time that contact member 35 of O2 engages its left-hand contact, current is supplied from positive terminal of battery 28 to the winding of relay 104, wire 111, left-hand contact of 35, wire 112, front contact 113 of relay 103, and back to the negative terminal of the battery. When relay 104 is energized, there is closed a stick circuit through its own front contact 114 and the contact 113 of relay 103. Recalling that the oscillator O1 is now inactive, the next time that 35 of oscillator O2 makes at its right-hand contact, relay 105 is energized by current flowing from positive terminal of battery 28, along wires 29 and 106, winding of relay 105, front contact 115 of relay 104, wire 116, right-hand contact of 35, wire 112 and contact 113 of relay 103 back to the negative terminal of the battery. As the relay 105 becomes energized, it closes a stick circuit through its own front contact 117 and the front contact 113 of the relay 103. The stick circuits for relays 104 and 105 prevent these relays from becoming deenergized as the oscillator O2 operates. The circuit for the relay 103 that includes the back contact 107 of relay 105 is now open but until the right-hand contact of 36 of oscillator O2 is open, relay 103 remains energized as will be evident from Fig. 1, and even after 36 swings towards the left, the relay 103 remains up during its release period. During the interval that all three relays 103, 104 and 105 are energized, a circuit is completed for both modulators M1 and M2. The circuit for M1 includes the front contact 118 of relay 105, front contact 119 of relay 104 and the front contact 120 of relay 103, while the circuit for M2 includes the front contact 121 of relay 105 and the front contacts 119 and 120. As oscillator O2 next swings to the left so that the contact member 34 engages its left-hand contact to close the output circuit of the generator G, the outgoing impulse supplied to the traffic rails is modulated by both M1 and M2. Since the circuit for the relay 103 is now opened at the back contact 107 of relay 105 and also at the right-hand contact of 36 of oscillator O2, this relay will drop at the end of its release period to open at the front contact 120 the circuit through which double modulation is being accomplished and restores the equipment to the normal control condition. When relay 103 drops, the stick circuits for both relays 104 and 105 are open at the contact 113, and these relays become deenergized.

If the operator on the locomotive desires to send a long signal impulse, he holds the key K depressed for a longer interval. The beginning of the operation of the relays 103, 104 and 105 is the same as above described. If the release period of 103 is such that it drops and relays 104 and 105 also drop before the contact member 35 of O2 leaves its left-hand contact, the relay 103 will be picked up by the circuit that includes the back contact 107 and the key K, which is still held down, and the relay 104 is also reenergized by a circuit that includes the left-hand contact of 35 and the front contact 113 of relay 103. The half cycle sending period of the oscillator O2 will be divided, therefore, into a part during which a normal control impulse is supplied and a part during which a signal impulse modulated by both M1 and M2 is supplied. If the relay 103 is given a release period such that it drops after 35 leaves its left-hand contact then the operation of the relays 103, 104 and 105 is such that every other sending period will be used for signaling impulses and every other sending period for control impulses. With either release period for the relay 103, the receiving of impulses modulated by both M1 and M2 at the caboose will cause both the primary relays 43 and 44 to be operated at the same time so that not only the usual brake control function is established but also a circuit for a slow-releasing relay 122 is closed at the front contact 68 of relay 43, and the front contact 74 of the relay 44 in series to energize that relay. With relay 122 energized then the circuit to the signaling device 123 is closed at its front contact 124 to energize the signaling device. As the relay 122 is made slow-releasing, it will remain closed as long as signaling impulses are intermittently received. While the operation of the relays 103, 104 and 105 have been described for the running position of the brake valve EV, an inspection of the Fig. 1 will disclose that the operation of these relays will take place in a similar manner when the handle 5 is set at the lap position. When the handle 5 is at release or emergency position and the oscillator O1 is active in place of the oscillator O2 then its contact members 25 and 26 perform the same function as described for the contact members 35 and 36 of the oscillator O2. It follows then that by the means of the signal equipment provided on the locomotive and at the caboose, messages can be exchanged between these two locations without in any way interfering with the control or indication function.

To sum up therefore, the control system here disclosed provides means at the control point to simultaneously affect the carrier current impulses with two types of characteristics, namely, different rates of occurrence of the impulses and different modulations of the impulses. At the operating point, the receiving means is not only selectively responsive to these two different types of characteristics but also selectively responsive to the different distinguishing qualities of each type. Although the two types of characteristics here used are rate of occurrence and modulation, it will be understood that other types might be used in combination to obtain the same results such, for example, as amplitude of the carrier current impulses and the number of impulses used in a cyclic group.

In my invention, the use of different modulating frequencies together with different rates of occurrence for the impulses, permit several operating functions of a mechanism being obtained with a high degree of selectivity by comparatively simple and reliable apparatus. With my invention, the many possible different combinations of modulating frequencies and rates of occurrence for the impulses permit any one of a large number of non-interfering control systems being established so that each train of a railway can be provided with a control system immune from interference by any near-by train even though there are available but few channels of carrier frequencies and modulating frequencies.

The usefulness of a control system where distinctive types of characteristics are simultaneously impressed upon a control current, with each type permitting of a number of distinctive qualities so that a large number of different combinations can readily be obtained, will be apparent to all familiar with control systems that have as an object the remote control of a mechanism adapted to establish any one of a plurality of operating conditions and especially so if there are a number of such mechanisms to be controlled independently of each other.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A control system including, a transmitting circuit, means to supply to the transmitting circuit a plurality of different codes each consisting of periodic impulses of current simultaneously affected by a distinctive rate of occurrence and modulation, a first receiving means controlled by said transmitting circuit selectively responsive to the rate of occurrence of the impulses of the different codes, a second receiving means controlled by the transmitting circuit selectively responsive to the modulation of the impulses of the different codes, and an operating mechanism jointly controlled by said two receiving means.

2. A control system including, a transmitting circuit, means to supply to the transmitting circuit a plurality of different codes each consisting of periodic impulses of alternating current simultaneously affected by a plurality of distinctive types of characteristics, a plurality of receiving means controlled by the transmitting circuit selectively responsive to the distinctive types of characteristics of the impulses of the different codes but not to the alternating current itself, and an operating mechanism controlled by said plurality of receiving means.

3. A control system including, a transmitting circuit, a source of current for said circuit, means adapted to provide a plurality of different qualities of each of two different types of characteristics, a selecting means to select a quality of each type of characteristics and to simultaneously affect the current supplied to said transmitting circuit with the selected qualities, a first receiving means controlled by the transmitting circuit selectively responsive to the distinctive qualities of one type of characteristics, a second receiving means controlled by the transmitting circuit selectively responsive to the distinctive qualities of the other type of characteristics, and an operating mechanism controlled jointly by the two receiving means.

4. A control system including, a transmitting circuit, a first coding means adapted to supply to the transmitting circuit a plurality of different codes each consisting of periodic impulses of current of a distinctive rate of occurrence, a second coding means adapted to modulate the code impulse with different modulations, a receiving circuit influenced by the transmitting circuit, a first control device controlled by the receiving circuit selectively responsive to the different rates of occurrence of the code impulses, a second control device controlled by the receiving circuit selectively responsive to the different modulations of the code impulses, and an operating mechanism jointly controlled by the said first and second control devices.

5. A control system including, a transmitting circuit, a first coding means adapted to supply to the transmitting circuit a plurality of different codes each consisting of periodic impulses of current having a distinctive characteristic, a second coding means adapted to impress a second distinctive characteristic upon the code impulses, a receiving circuit influenced by the transmitting circuit, a first control device controlled by the receiving circuit selectively responsive to the different characteristics of the code impulses as provided by the first coding means, a second control device controlled by the receiving circuit selectively responsive to the different characteristics of the code impulses as provided by the second coding means, and an operating mechanism jointly controlled by the said first and second control devices.

6. A control system including, two spaced locations, an operating mechanism at one location having a plurality of operating conditions, transmitting means including a source of current at the other location, means capable of establishing a plurality of distinctive qualities of each of two different types of characteristics, manually controlled means at the second mentioned location adapted to simultaneously affect the current of the transmitting means with a distinctive quality of each of the two different types of characteristics for each operating condition of said operating mechanism, and receiving means at the first mentioned location influenced by the transmitting means selectively responsive to the qualities impressed on the current of the transmitting means for causing the operating mechanism to register with the condition established by the manually controlled means.

7. A control system including, two spaced locations, an operating mechanism at one location having a plurality of operating conditions, a transmitting means at the other location, means capable of supplying to the transmitting means periodic impulses of current at a plurality of different rates of occurence and to impress on the impulses a plurality of different modulating frequencies, a manually controlled means at the second mentioned location adapted to select a distinctive rate of occurrence and a distinctive modulating frequency for the impulses for each operating condition of said operating mechanism, and receiving means at the first mentioned location influenced by the transmitting means selectively responsive to the rate of occurrence and the modulating frequency of the impulses for causing the operating mechanism to register with the condition established by the manually controlled means.

8. A control system including, a transmitting means adapted to supply impulses of carrier current at different rates of occurrence and modulated at different modulating frequencies; a receiving means comprising, electrically tuned circuits selectively responsive to the different modulating frequencies of the impulses of current and mechanically tuned devices selectively responsive to the different rates of occurrence of the said impulses; and control circuits selectively controlled by said electrically tuned circuits and said mechanically tuned devices.

9. A control system including, a transmitting means adapted to supply a carrier current having impressed thereon two different frequency characteristics, a receiving means influenced by the transmitting means comprising an electrically tuned circuit selectively responsive to one frequency characteristic impressed on the carrier current, but not to the carrier current itself and a mechanically tuned device selectively responsive to the other frequency characteristic impressed on the carrier current but not to the carrier current itself; and a control circuit jointly controlled by the electrically tuned circuit and said mechanically tuned device.

10. A control system for railway trains including, a source of periodic impulses of carrier current, means to determine the rate of occurrence of the impulses, means to modulate said carrier current with different modulating frequencies, selecting means to formulate different code combinations of rate of occurrence and modulation for the impulses of the carrier current, a receiving means on a train influenced by said carrier current; two electroresponsive devices carried on the train controlled by said receiving means one slectively responsive to the different rates of occurrence of the impulses and the other device selectively responsive to the different modulations of the impulses; and an operating mechanism having a plurality of conditions selectively controlled by said electroresponsive devices.

11. A control system for railway trains including, a source of periodic impulses of carrier current, manually controlled means located at one point on a train to establish different rates of occurrence of the periodic impulses and to modulate said impulses with different modulating frequencies, a receiving means located at a second point on the train influenced by said carrier current impulses; two electroresponsive devices controlled by said receiving means; one selectively responsive to the different rates of occurrence of the impulses and the other device selectively responsive to the different modulations of the impulses; and a brake controlling mechanism adapted to produce different conditions of the brake pipe pressure jointly controlled by said electroresponsive devices.

12. A control system including, a control location and an operating location, a manually controlled means at the control location to supply different code combinations of the duration and modulation of carrier current impulses, an automatic means at the operating location adapted to supply different code combinations of the duration and modulation of carrier current impulses, transmitting and receiving means at each location synchronized to alternately and periodically exchange between the two locations said impulses of carrier current, so arranged that the code combination selected at the control location determines the code combination established at the operating location, and an operating mechanism at each location each controlled by the code combination of the impulses supplied at the opposite location.

13. A control system including, a control station and a remote station, a transmitting means at the control station to supply periodic impulses of carrier current, a manually controlled means to modulate said impulses with either one of two modulators, a receiving means at the remote station selectively responsive to the different modulations of said carrier current impulses for causing an operating mechanism to assume different conditions, a signaling means at the control station adapted to at times impress the impulses with both modulators, and a signal device at said remote station rendered active by said receiving means when influenced by impulses modulated by both modulators.

14. A control system including, a control station and a remote station, a return indication means at the remote station to supply periodic impulses of carrier current modulated by one or the other of two different modulating frequencies depending upon different operating conditions, a manually controlled means adapted when actuated to impress on the impulses supplied by the return indication means the modulating frequency not already being impressed on the impulses in response to the operating condition, a receiving means at the control station influenced by the impulses of carrier current selectively responsive to the different modulating frequencies, an indicating device controlled by said receiving means rendered active in response to either or both modulating frequencies, and a signaling device controlled by the receiving means rendered active only when both modulating frequencies are impressed on the current impulses.

15. A control system including two remotely located stations, means at one station to automatically transmit periodic impulses of carrier current modulated by either one or the other of two different modulating frequencies in accordance with different operating conditions, manually controlled means to impress upon said impulses of carrier current the other modulating frequency in addition to the frequency corresponding to the operating condition, a receiving means at the other station responsive to the carrier current impulses, an indicating means controlled by the receiving means rendered active in response to either modulating frequency, and a signaling device controlled by the receiving means rendered active only in response to both modulating frequencies.

16. A control system including, a source of carrier current, means to interrupt said carrier current at either of two different rates of interruptions, means to modulate the carrier current by either of two different modulating frequencies, a first manually controlled means to supply different control codes each consisting of impulses of the carrier current having one or the other rates of interruptions and one or the other modulating frequencies, a receiving means selectively responsive to the different codes to establish different control conditions, a second manually controlled means to cause the impulses of the control code established by the first manually controlled means to be modulated by both modulating frequencies simultaneously, and means controlled by the receiving means to establish a signal as well as the normal condition corresponding to the code in response to the added modulating frequency.

In testimony whereof I affix my signature.

ANDREW J. SORENSEN.